(No Model.)

H. SOMMERFELD.
CORN HARVESTER.

No. 535,422. Patented Mar. 12, 1895.

Witnesses:
F. G. Fischer
G. J. Thorpe

Inventor:
Heinrich Sommerfeld
By Higdon & Higdon
Attys.

THE NORRIS PETERS CO., PHOTO-LITHO., WASHINGTON, D. C.

UNITED STATES PATENT OFFICE.

HEINRICH SOMMERFELD, OF CANTON, ASSIGNOR OF ONE-HALF TO KARL EHRLICH, OF LEHIGH, KANSAS.

CORN-HARVESTER.

SPECIFICATION forming part of Letters Patent No. 535,422, dated March 12, 1895.

Application filed July 13, 1894. Serial No. 517,419. (No model.)

*To all whom it may concern:*

Be it known that I, HEINRICH SOMMERFELD, of Canton, McPherson county, Kansas, have invented certain new and useful Improvements in Corn-Harvesters, of which the following is a full, clear, and exact description, reference being had to the accompanying drawings, forming a part hereof.

My invention relates to corn harvesters, and has for its object to produce a machine of this character wherein the cutting mechanism is advanced or occupies its operative position when the draft animals are in motion, and is automatically retracted immediately the draft animals cease pulling and stop or back, so that it is impossible for the draft animals to be injured by the cutting mechanism.

A further object is to produce a corn harvester of light draft, which is positive and reliable in operation, and simple, strong, durable, and inexpensive of construction.

With these objects in view the invention consists in certain peculiar and novel features of construction and combinations of parts, as hereinafter described and claimed.

In order that the invention may be fully understood, reference is to be had to the accompanying drawings, in which—

Figure 1:
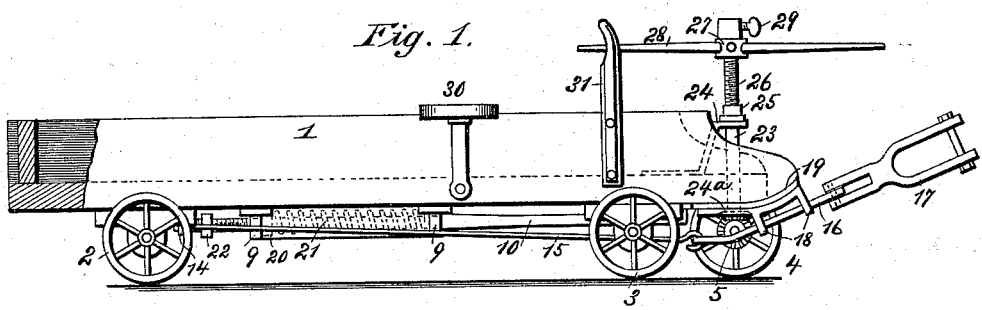
Figure 2:
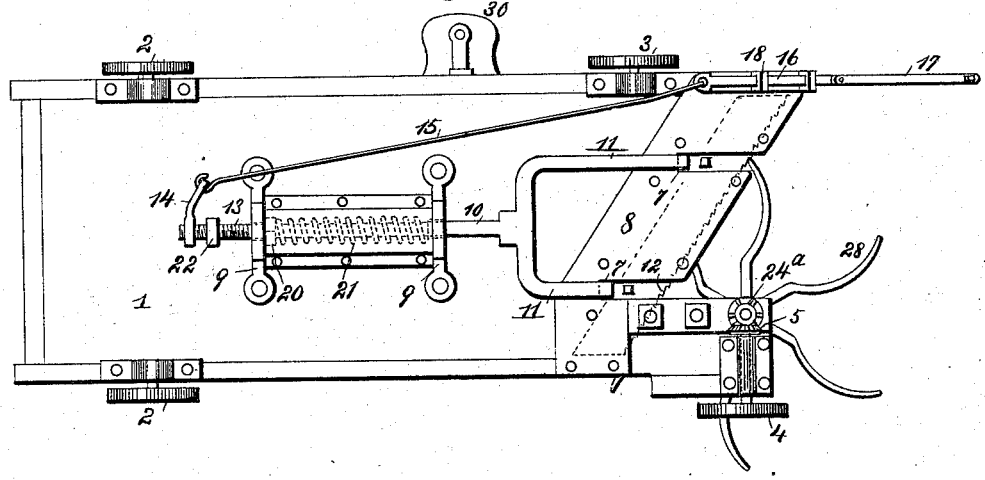
Figure 3:
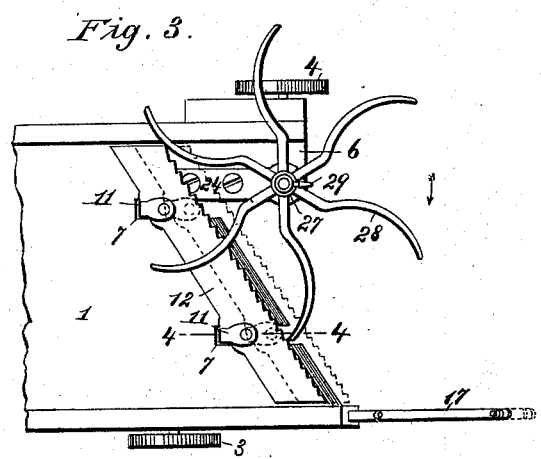

Figure 1. is a side elevation of a corn harvester embodying my invention. Fig. 2. is an inverted plan view of the same. Fig. 3. is a top plan view of the front end of the harvester, and Fig. 4. is a vertical sectional view taken on the line 4—4 of Fig. 3.

In the said drawings, 1 designates the body portion of the harvester, which is mounted upon the rear wheels 2 and the front wheels 3 and 4; the wheel 4 being arranged a short distance in advance of the wheel 3, for a purpose which hereinafter appears, and mounted upon the inner end of the shaft of the wheel 4, is a beveled gear-pinion 5.

The bottom of the harvester at its front end inclines rearwardly toward the left hand side of the machine, to a point a suitable distance rearward of the shaft of the wheel 4, and not entirely to the opposite or left hand margin of the machine, so as to leave the forwardly projecting portion 6, and this inclined margin or end is longitudinally notched or recessed at 7, at points equally distant from the longitudinal center of the machine. The front end of the bottom is also provided with a projecting wear-plate 8, which is also provided with notches or recesses, which register with the notches or recesses 7 alluded to.

Figure 4:
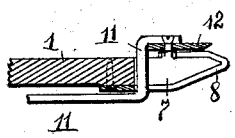

Secured transversely to the under side of the body portion of the harvester at a suitable distance apart, are the brackets 9, and extending longitudinally of the machine and slidingly through apertures in said brackets, is the draw-bar 10, and this draw-bar at its front end is forked or provided with the longitudinally extending branch arms 11, which at their front ends are bent upwardly through the notches or recesses 7, and are secured rigidly to the upper side of the inclined cutting knife 12; said cutting knife being provided preferably with saw-teeth at its front and cutting margin, and the inclination of the same corresponding to the inclination of the front end of the bottom of the machine, and said knife rests upon the upper portion of the wear and protection plate 8, as is shown most clearly in Fig. 4.

The rear end of the draw-bar is preferably screw-threaded, as shown at 13, and secured upon said threaded portion, and projecting laterally toward the right or toward the side of the machine opposite from the wheel 4, is an arm 14, and this arm is connected by a link-rod 15 to the sliding-bar 16, which engages aligned apertures in the depending arms 18 of the bracket 19, secured to the front end of the machine. This sliding-bar 16 preferably inclines slightly upward, so as to be in the line of draft from the animals and thereby avoid all friction possible, and pivoted to the front end of the sliding-bar 16, is a clip 17, to which the draft animals are attached in the ordinary manner.

Mounted upon the draw-bar between the brackets 9, is a nut or enlargement 20, and spirally encircling said draw-bar and bearing at its opposite ends against the front side of said nut or enlargement and the rear side of the bracket 9 nearest to the front of the machine, is an expansion-spring 21, and this spring normally holds the nut or enlargement 20 against the front side of the rearmost bracket 9, so that the front or cutting margin of the knife will occupy its inoperative position, which is a slight distance rearward of the front margin of the protection and wear plate 8, as clearly shown in full lines in the drawings, and at the same time the spring holds the sliding-bar 16 in its retracted position.

When the draft animals are attached to the clip and begin to pull, they first overcome the resistance of the spring 21, and advance the sliding-bar until the knife which operates therewith has its cutting margin beyond the front margin of the protection or wear plate 8, as clearly shown in dotted lines, Fig. 3, and this forward movement of the cutting-knife and sliding-bar is limited preferably by means of a nut or enlargement 22 upon the threaded end of the draw-bar, which comes in contact with the rear side of the rearmost bracket 9, as will be readily understood. The continued pull of the draft animals will now draw the machine across the field, with the cutting-knife holding its operative or advanced position.

In order to gather and feed the corn against the advanced knife, the vertical shaft 23 is journaled in the projecting portion 6 at the front of the machine, and also in the bracket 24 carried thereby, and secured upon said shaft is a collar 25, which rests upon said bracket and supports the shafts so that the gear-pinion 24$^a$ upon its lower end shall at all times mesh with the gear-pinion 5 hereinbefore referred to. Mounted and vertically adjustable upon the upper and screw-threaded portion 26 of said shaft, is a hub or collar 27, which is provided with the radial arms 28, and the reel or gatherer comprising said hub and said arms is secured at any point of its adjustment by means of the set-screw 29.

In the operation of the machine, the knife is first advanced, and then the machine drawn forward as above explained, and the rotatable movement of the wheel 4 causes the rapid rotation of the reel in the direction indicated by the arrow, Fig. 3, and the arms of the same engage the upper portion and force the corn against the cutting edge of the knife, and then throw it to the rear and into the body-portion of the machine. After sufficient corn is gathered, the driver stops the draft animals, and immediately they cease pulling the spring reacts and withdraws the cutting edge of the knife rearward of the front margin of the protection and wear plate 8, so that it will be impossible for the draft animals to cut or injure themselves upon the knife. The driver, who occupies the seat 30, then throws the reins around the rein-bar 31, shocks the corn, and deposits it upon the ground. The succeeding operations are repetitions of the one described.

From the above description, it will be apparent that I have produced a corn harvester wherein the knife is automatically advanced while the machine is in motion, and is automatically retracted when the draft animals cease pulling, and which is simple, strong, durable, and inexpensive of construction.

Having thus described my invention, what I claim as new, and desire to secure by Letters Patent, is—

1. In a corn harvester, the combination with a wheeled framework, a sliding frame carried thereby, and a knife carried by said sliding frame, of a sliding or draft-bar projecting at the front end of the machine, to which the draft-animals are to be attached, and a link-rod connecting the sliding-frame and the sliding or draft-bar together, substantially as set forth.

2. In a corn harvester, the combination with a wheeled framework, having its front margin longitudinally notched or recessed, a sliding frame carried at the under side of said framework and projecting upward through said notches or recesses, and a knife carried by said sliding frame at the front end and upper side of the bottom of said framework, of a sliding or draft bar, to which the draft-animals are to be attached, an arm projecting from the sliding frame, a link-rod connecting the sliding or draft bar and the said arm, and a spring yieldingly holding the sliding frame and the sliding bar in their retracted position, so that the knife shall be rearward of the front end of the bottom of the framework, substantially as set forth.

3. In a corn harvester, the combination of a suitable framework notched at its front margin, wheels supporting the same, apertured brackets secured to the under side of the machine, a sliding frame arranged at the under side of the framework and engaging the apertures of said brackets, a spring retracting the same, an inclined knife carried at the front end of the framework and having its cutting margin parallel with the front margin of the bottom of the framework, and a sliding or draft bar operatively connected to the sliding frame and operatively connected to the draft animals, substantially as set forth.

In testimony whereof I affix my signature in presence of two witnesses.

HEINRICH SOMMERFELD.

Witnesses:
F. G. FISCHER,
M. R. REMLEY.